United States Patent [19]

Meyers

[11] Patent Number: 4,796,338
[45] Date of Patent: Jan. 10, 1989

[54] WIRE TENSIONER

[75] Inventor: Richard G. Meyers, Euclid, Ohio

[73] Assignee: The National Telephone Supply Co., Cleveland, Ohio

[21] Appl. No.: 840,035

[22] Filed: Mar. 17, 1986

[51] Int. Cl.⁴ ............................................. A44B 21/00
[52] U.S. Cl. .................................. 24/68 R; 24/68 D; 24/132 R; 254/259
[58] Field of Search ................. 24/68 R, 68 PP, 68 D, 24/68 SB, 68 AS, 68 FP, 19, 115 R, 265 CD, 132; 254/259; 256/37; 403/389

[56] References Cited

U.S. PATENT DOCUMENTS

| | | | |
|---|---|---|---|
| 752,074 | 2/1904 | Jackson | 24/68 D |
| 1,591,525 | 7/1926 | Gardner et al. | 24/132 R |
| 1,759,485 | 5/1930 | Page | 24/132 R X |
| 2,034,841 | 3/1936 | Staggers | 24/132 R |
| 2,773,566 | 12/1956 | Staggers | 24/132 R X |
| 4,413,382 | 11/1983 | Siegmann | 24/132 R |
| 4,450,603 | 5/1984 | Hirsch | 24/132 R |

FOREIGN PATENT DOCUMENTS 891058  3/1962  United Kingdom ............ 24/132 R

Primary Examiner—Kenneth J. Dorner
Assistant Examiner—Laurie K. Cranmer
Attorney, Agent, or Firm—Woodling, Krost and Rust

[57] ABSTRACT

A device for connecting and tensioning two wires. The device includes two operating members or blocks which are movable back and forth relative to each other in a substantially longitudinal direction. The operating members have gripping portions which coact with the wires to tension the wires upon reciprocal movement of the members. In one embodiment the wires are tensioned in one direction of movement of the members relative to each other and in another embodiment the wires are tensioned in both directions of movement of the members relative to each other.

14 Claims, 6 Drawing Sheets

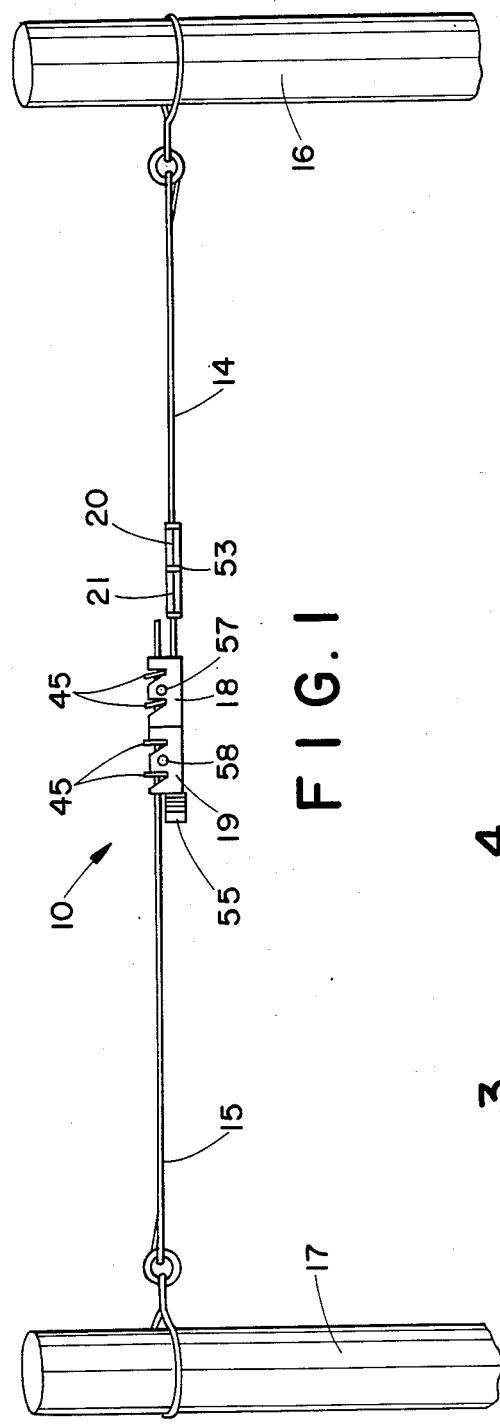
FIG. 1
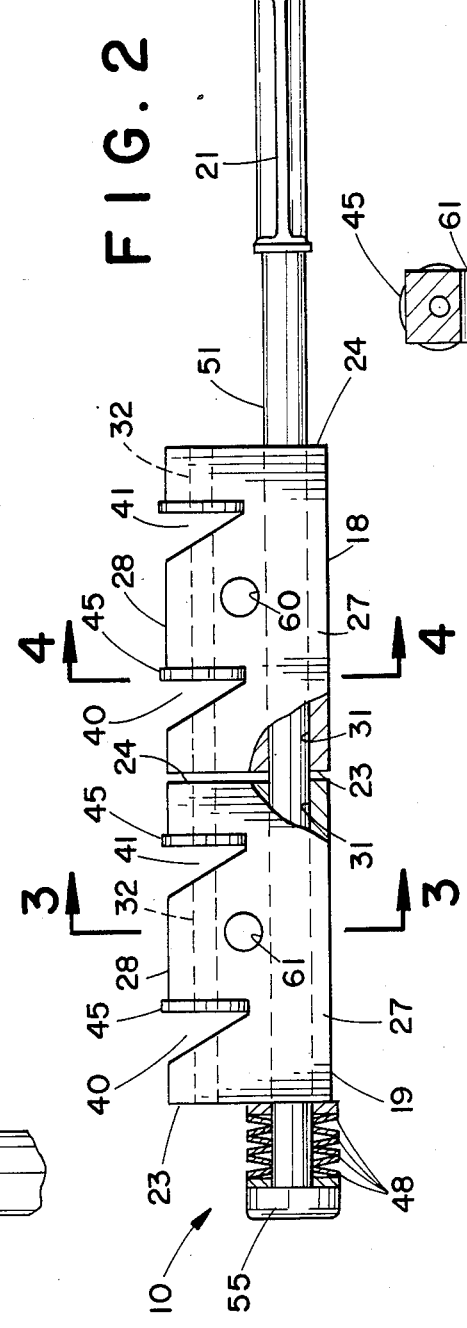
FIG. 2
FIG. 3
FIG. 4

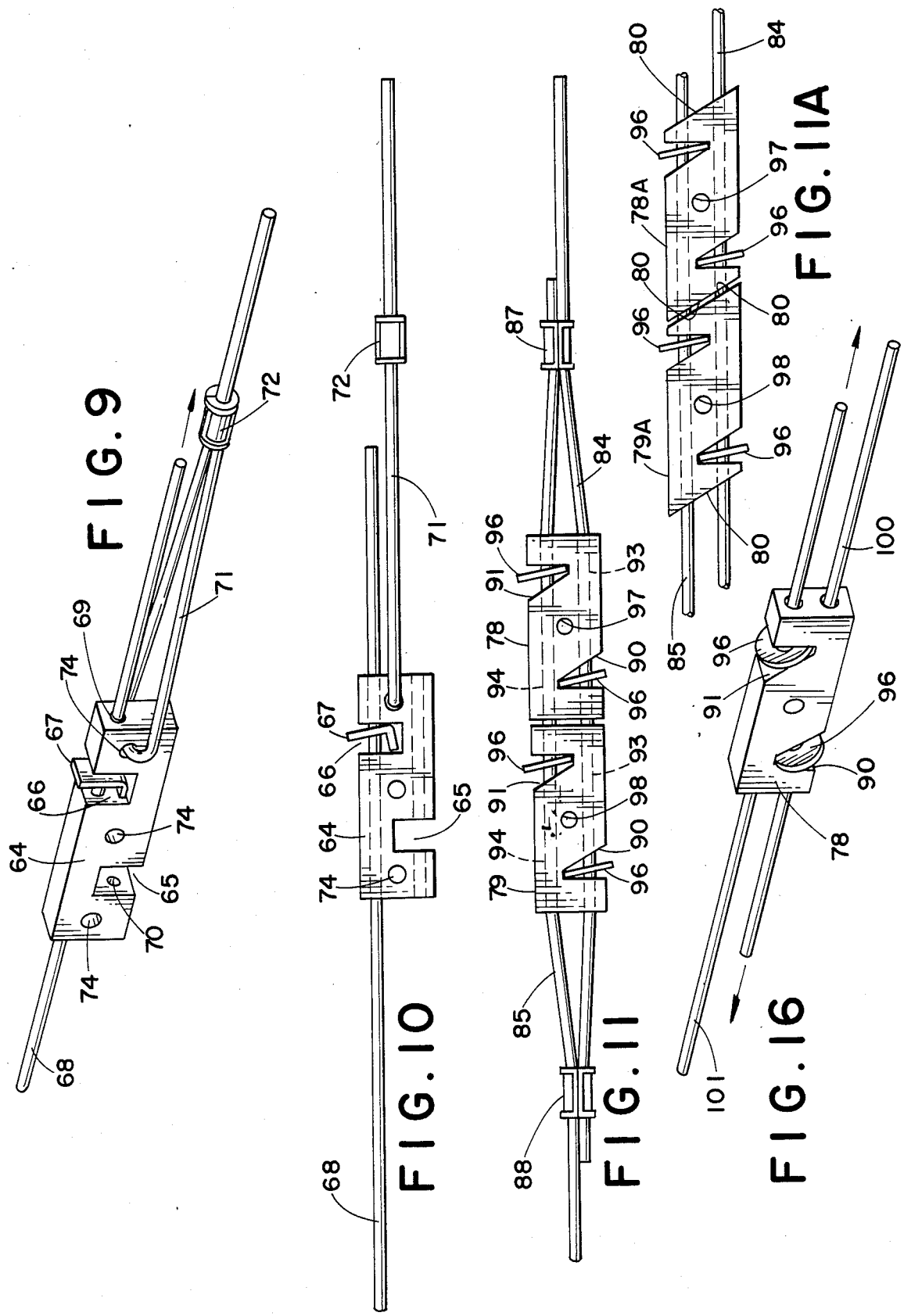

WIRE TENSIONER

The present invention relates to a wire tensioner for quickly and conveniently connecting the ends of two wires and tensioning the connected wires the desired amount.

In the construction of fences, such as fences which are to have an electric charge applied, it is necessary to tension the wires to on the order of 200-300 pounds. Devices designed to accomplish this are conventionally connected to the opposed ends of two wires with a rotatable member connected to one wire and serving to tension the connected wires by a rotating action. A ratchet serves to prevent unwinding and thus maintains tension and a tension type spring indicates the amount of tension applied to the wire These devices form a permanent part of the fence strand. In general present state of the art devices are rather bulky and unsightly appearing in the finished fence It is therefore an object of the present invention to provide an efficient and economical device for connecting the ends of two wires and tensioning the connected wires to the desired degree.

Another object of the present invention is to provide a wire connecting and tensioning device which remains as a permanent part of the wire strand and which has an unobtrusive appearance.

Another object of the invention is to provide a tensioning device wherein the tensioning is accomplished by a longitudinal back and forth movement of an operating member.

Another object of the invention is to utilize spring washers to indicate the tension applied to two connected wires.

A still further object of the invention is to provide a tensioning device which includes first and second operating members which move back and forth relative to each other between first and second positions with the members each having gripping means with one of the gripping means being operable in movement in one direction and the other gripping means being operable in movement in the other direction. Another version illustrates a variation wherein the gripping means in each operating member is operable in each direction of movement.

An additional object of the invention is to use a single operating member as a wire dead-end device or as a device to remove slack from a wire or from two wires.

Other objects and a fuller understanding of this invention may be had by referring to the following description and claims, taken in conjunction with the accompanying drawings, in which:

FIG. 1 is an elevational view generally illustrating the environment of the wire tensioner of the present invention;

FIG. 2 is an enlarged elevational view of the wire tensioner device shown in FIG. 1;

Figure 5:
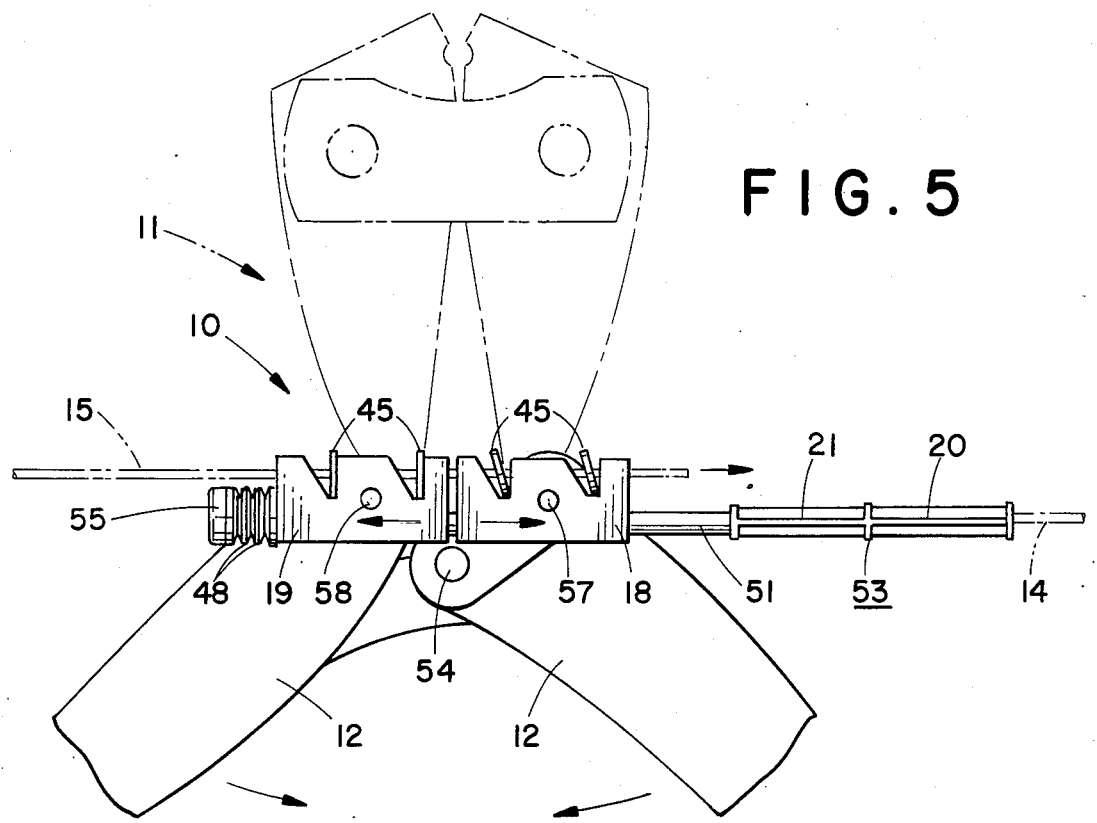
Figure 6:
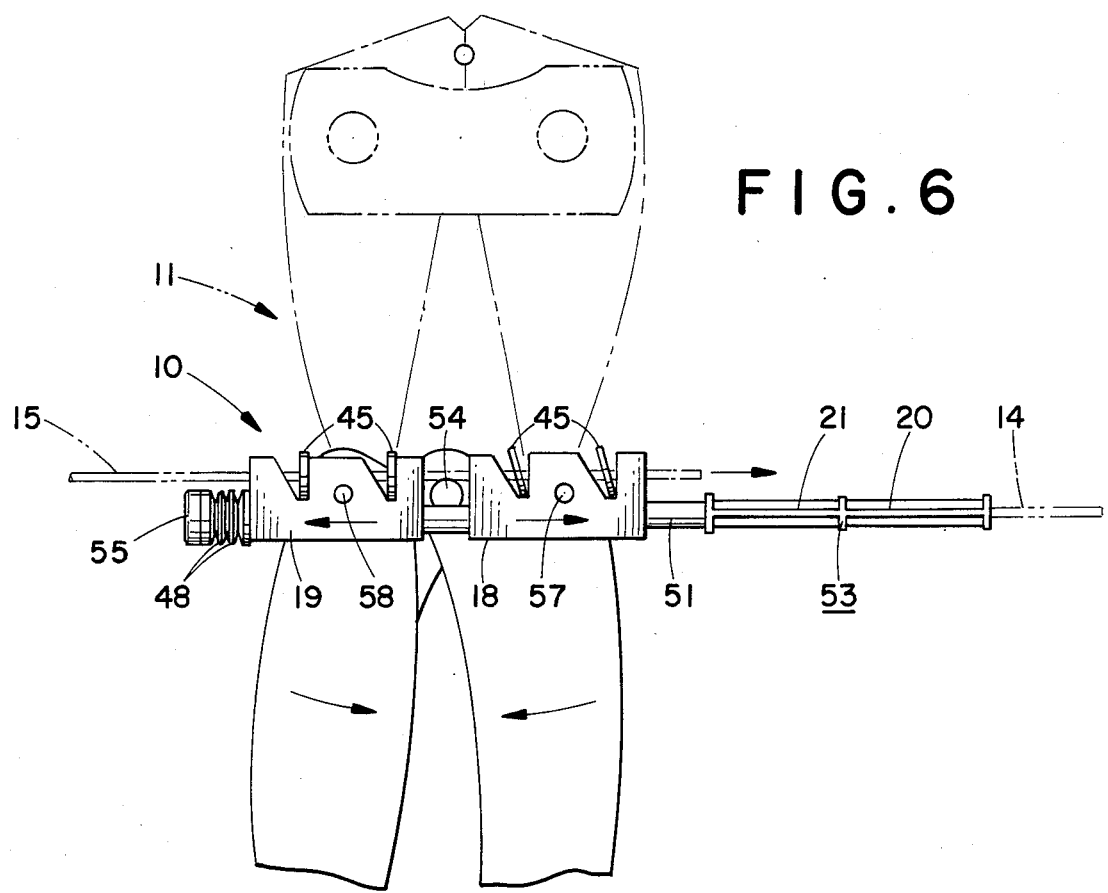
Figure 7:
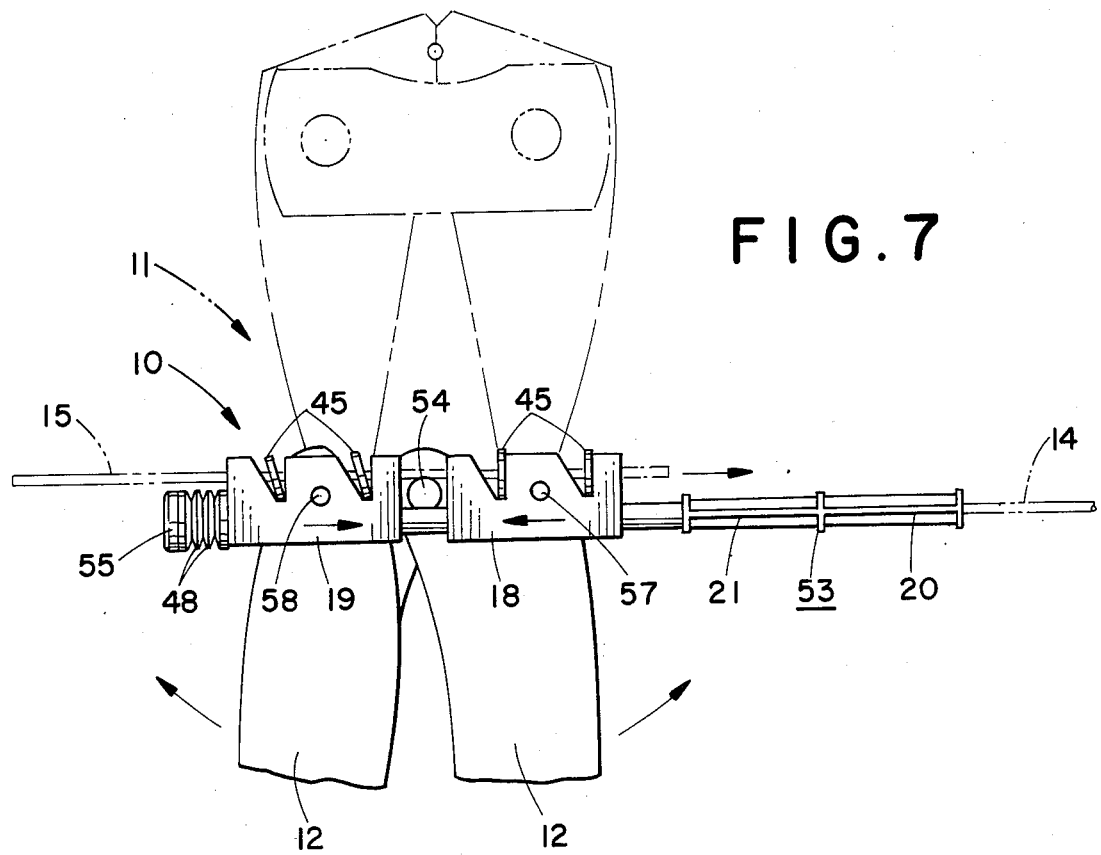
Figure 8:
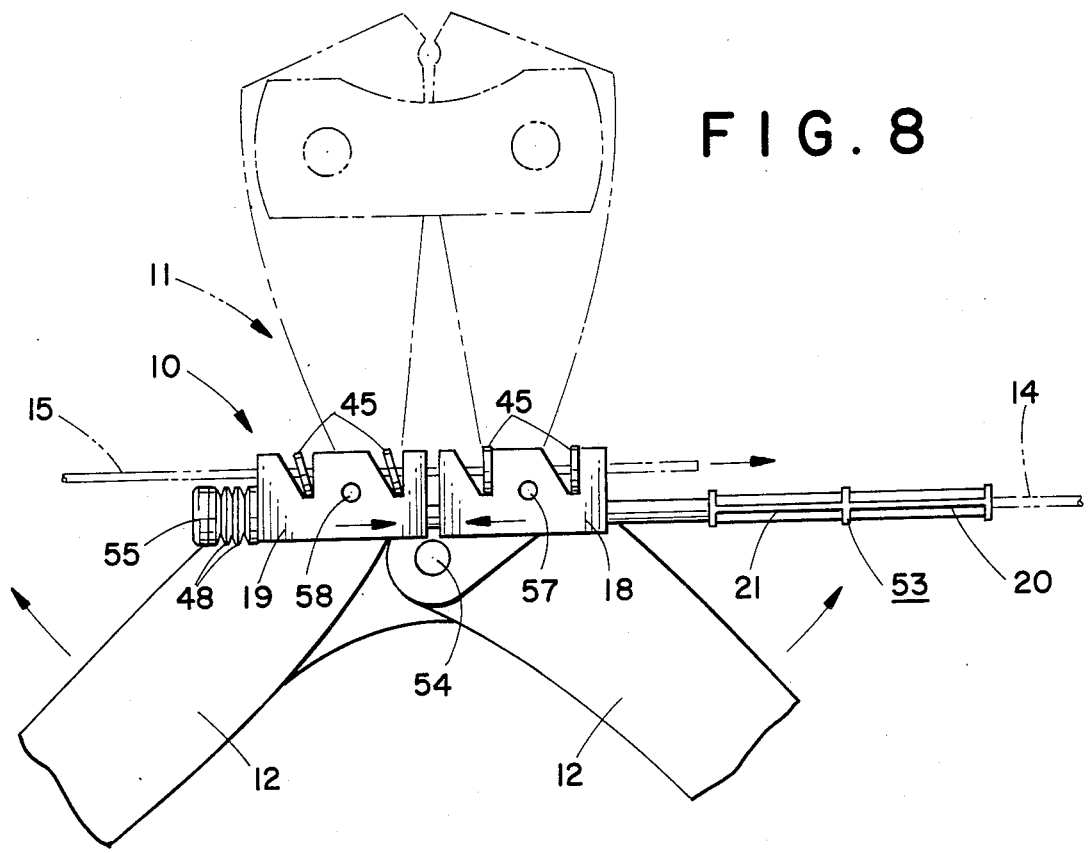

FIG. 3 a view taken generally along the line 3—3 of FIG. 2;

FIG. 4 is a view taken generally along the line 4—4 of FIG. 2;

FIG. 5 is an elevational view partially in section of the wire connecting and tensioner device of the present invention and as associated with a tool for actuating the same;

FIGS. 6, 7 and 8 are views similar to FIG. 5 but showing sequential positions of the device as the actuating tool is operated;

FIG. 9 is an isometric view illustrating a variation of the invention which is shown in FIGS. 1-8;

FIG. 10 is an elevational view of the device shown in FIG. 9 and illustrating the gripping washer or member in a position different from that shown in FIG. 9;

FIG. 11 is an elevational view of another form of the wire tensioner from that shown in FIGS. 1-8 and illustrates the wire tensioner after two wires have been connected and tensioned to the desired degree and illustrates a method of final connection of the assembly.

FIG. 11A is an elevational view showing a structural variation in the operating members which are shown in FIG. 11;

FIGS. 12-15 are similar to FIGS. 5-8 respectively in that they illustrate the wire tensioner of FIG. 11 in association with a tool for the actuation of the wire tensioner and FIGS. 12-15 illustrate sequential positions of the device as the actuating tool moves the wire tensioner through a complete cycle of operation to provide the proper tension to the two connected wires; and FIG. 16 is an isometric view illustrating a variation of the invention which is shown in FIGS. 11-15.

The wire tensioner device of the present invention as disclosed in the accompanying drawings (FIGS. 1-8) is indicated generally by the reference numeral 10 and is shown in FIG. 1 in its environment in connecting and tensioning first 14 and second 15 wires which are shown respectively connected to posts 16 and 17.

The tensioning device 10 which is adapted to connect the ends of wires 14 and 15 together and in the same process tension the wires to the desired degree is comprised of first and second operating members 18 and 19 respectively. Each of the operating or block members 18 and 19 has what has been referred to and identified as first and second end portions 23 and 24 respectively and each also has first and second side portions 27 and 28 respectively. The operating members are sometimes referred to as wire gripping members and the two are disposed generally in end to end relationship as seen in the drawings with the first end portion 23 of the first operating member 18 engageable with the second end portion 24 of the second operating member 19.

First and second sets of aligned openings 31 and 32 extend respectively through first and second side portions 27 and 28 of the first and second operating members 18 and 19. The first set of openings 31 are generally parallel to the second set of openings 32.

The first wire 14 is adapted to be connected to the operating member 19. As illustrated herein the end of the wire 14 is adapted to be secured to a splicing sleeve 53 by crimps 20 with the splicing sleeve 53 at another end portion connected by crimps 21 to a rod 51 which extends through the openings 31 and this rod is provided with a head 55 at the first end portion 23 of member 19. A plurality of spring washers 48 are provided between the head and the first end portion of the second operating member The function of the spring washers 48 will be described in detail hereinafter. The head 55 of the rod 51 functions as a stop member which prevents the first wire 14 from separating or being removed from the first and second operating members with which it cooperates.

The second set of openings 32 receive the second wire 15 therethrough as illustrated in the drawings.

First and second generally V-shaped slots 40 and 41 respectively are formed in the second side portion 28 of each of the first and second operating members and each is adapted to receive a gripping washer member 45. Each washer 45 has an opening extending through the central portion thereof and the second wire 15 extends through this opening in each of the gripping washers 45. A tool 11 (FIGS. 5-8) is provided with studs 57 and 58 which are adapted to extend respectively through openings 60 and 61 which extend through the operating members 18 and 19. By this means the operating members are adapted to be moved relative to each other in a longitudinal direction by actuating the tool 11 as generally illustrated in FIGS. 5-8. The tool may be of the type shown in U.S. Pat. No. 2,254,416.

FIGS. 5-8 illustrate the sequential movement of the tensioner as operated by tool 11 in its function of connecting and tensioning the first and second wires 14 and 15. FIG. 5 illustrates the first step in the operation of the device and shows the preferred position of the first and second operating members relative to each other with studs 57, 58 extending through openings 60, 61. In this position the first wire 14 has been connected to the headed rod 51 by means of the splice sleeve 53 and the second wire 15 has been inserted through the aligned second openings 32 in each of the operating members 18 and 19. In this position the second wire 15 extends through the openings in the four gripping washers 45. The tool 11 is appropriately actuated (see arrows on FIG. 5) at this point in time moving the first operating member 18 as illustrated in FIG. 5. Even though the tool 11 moves member 19 relative o a center pivot 54 the effective movement of members 18, 19 is that member 18 moves back and forth relative to member 19. Movement of the first operating member 18 in the direction shown causes the gripping washers 45 in the V-shaped slots 40 and 41 in the first operating member to tip or slant slightly as illustrated in FIG. 5 whereas the washers 45 in the second operating member 19 maintain their generally vertical position This causes the second wire 15 to be gripped by the washers in operating member 18 to cause the second wire to be pulled through and relative to the second operating member where the gripping washers 45 occupy their generally vertical position In this circumstance handle force is required on the handles 12 of the tool 11.

FIG. 6 illustrates the relative positions of operating members 18, 19 as the handles 12 reach the limit of their movement in the direction of the arrows. Operating member 18 has advanced the wire 15 relative to member 19 the amount shown Member 18 is still gripping the wire 15 and handle force is still required When the operating member 18 has reached the limit of its longitudinal movement away from the second operating member 19, the tool 11 is then actuated so as to move the first operating member 18 back toward the second operating member 19 as illustrated in FIG. 7. Under this set of circumstances the washers in operating member 18 maintain an untilted condition whereas the washers 45 in the second operating member 19 assume a tilted position as illustrated in FIG. 7. This causes the second wire 15 to be held by the second operating member 19 while the first operating member 18 is moving back to its position adjacent the second operating member 19 which position is shown in FIG. 8. Under these conditions no handle force is required The wire 15 is advanced as illustrated in one cycle of operation.

These steps are repeated until the connected wires have been tensioned the desired amount and the desired amount is visually discernible by observing the spring washers 48 (see FIG. 2). It will be noted there are six washers 48 arranged in three back to back pairs or sets. Each back to back pair forms a "V" gap. The spring washers 48 are designed so that collapse of the "V" gap of the first pair of back to back washers next to the head 55 of rod 51 indicates that a predetermined tension has been achieved, for example 100 pounds whereas the middle pair of spring washers when bent or distorted may for example illustrate a tension of 200 pounds. Distortion of the other set of spring washers furthest from the head 55 of the rod 51 may for the sake of example illustrate a tension of 300 pounds. It will be appreciated by those skilled in the art that other mechanical means are available to demonstrate in a visual fashion the amount of tension achieved by the tensioner in securing the ends of the two wires 14 and 15.

FIG. 9 illustrates a variation of the invention shown in FIGS. 1-8 and in similar manner is a variation of the invention which is shown in FIGS. 11-15. The relationship of this embodiment of the invention to the other embodiments will be understood after consideration of the detailed discussion of the structure of the device and its function. This embodiment of the invention includes an operating member 64 and as will be noted it is a single operating member as distinguished from two operating members as shown in the embodiments of FIGS. 1-8 and 11-15. The operating member 64 includes a rectangularly shaped slot 66 which is functional in its operation in this embodiment and also includes a second rectangularly shaped slot 65 on what may be referred to as the underside of the operating member which is non-functional.

An L-shaped washer 67 is located in slot 66 and a wire 68 to which tension is to be applied or from which slack is to be removed extends through an opening 69 which goes the entire length of the operating member 64. The wire also extends through an opening in the L-shaped washer 67. An opening 70 extends parallel to the opening 69 through the lower portion of the operating member and is non-functional in the sense that no wire extends through this opening. It will be seen hereinafter in the embodiment of the invention disclosed and shown in FIGS. 11-15 the purpose of an opening similar to opening 70. A plurality of lateral openings 74 extend through the operating member and are for a purpose as illustrated in FIGS. 9 and 10 and as further described hereinafter.

A so-called dead end wire 71 extends through one of the lateral openings 74 and is secured upon itself by a crimped sleeve 72 as illustrated to attach the operating member 64 to a dead end or other abutment device not shown which will be discussed in describing the operating and function of the device illustrated in FIG. 9.

As indicated above the device illustrated in FIGS. 9 and 10 is a variation of the other embodiments illustrated in this application. In connection with the embodiment illustrated in FIGS. 1-8 this version illustrates how a single operating member may be used by itself; also indicates how the slots may be varied to a generally rectangular shape as distinguished from the generally V-shape illustrated in FIGS. 1-8. Additionally a variation from the embodiment shown in FIG. 1-8 resides in the fact that a generally L-shaped washer 67 is illustrated as distinguished from the flat circular washers 45 shown in FIGS. 1-8. The function performed by the slots and the washers of FIGS. 9-10 is essentially the same as that in FIGS. 1-8.

The embodiment of FIG. 9 illustrates how one of the operating members can be used to remove slack from the wire 68. In the position shown in FIG. 9 it will be seen that the wire 68 is moved relative to the operating member in the direction illustrated by the arrow in this Figure. In other words one seeking to remove slack from the wire 68 simply holds the wire 68 and pushes it through the opening 69 in the direction of the arrow. In this manner the slack is removed from the wire and the movement of the wire through the operating member is permitted because this particular action maintains the L-shaped washer 67 in what may be referred to as its vertical position or square with the slot 66 so that the wire may pass through. When the force of a workman is removed from wire 68 the wire 68 is prevented from moving out of the operating member or to the left shown in FIGS. 9 and 10 by the action of the L-shaped washer which assumes the tilted position shown in FIG. 10.

The use of a plurality of lateral openings 74 provides flexibility in that the block members may be made of different lengths to improve alignment of the blocks and wires. Additionally with the use of several lateral openings flexibility in the size of the tool 11 can be had. Also as shown in FIG. 9 the use of the lateral openings enables the device to be conveniently connected to a dead end.

The embodiment of the invention shown in FIGS. 11-15 is a variation of that illustrated in FIGS. 1-8 in the positioning of the gripping washers on opposite sides of the blocks. This converts the blocks or operating members into a double action function This double action function increases wire tension when the blocks or operating members are forced apart and also when they are forced together When the blocks or operating members are not being moved or forced in one direction or the other the gripping members in either one or both lock the wires in a fixed position and maintain tension in the wires As will be described hereinafter a single one of the blocks illustrated in FIGS. 11-15 and as shown in FIG. 16 may be used by itself to take up slack in two wires.

The embodiment of the invention illustrated in FIG. 11 comprises first and second operating members 78 and 79 which in a fashion similar to the embodiment shown in FIGS. 1-8 includes aligned longitudinally extending openings extending through both the upper portion of each block member or operating member and through the bottom portions. First and second wires 84 and 85 are adapted to extend respectively through these aligned openings First and second V-shaped slots 90 and 91 are provided in each of the operating members 78 and 79 in the manner illustrated in FIG. 11 and gripping washers 96 are adapted to reside in each of these V-shaped slots and each of these washers has a central opening which receives a respective one of the wires 84 and 85 in the manner illustrated It will be seen in the embodiment of FIGS. 11-15 that the slots are essentially V-shaped as in FIGS. 1-8 and the gripping washers 96 are circular in configuration. It will be understood by those skilled in the art that the slots and washers might be of the shape illustrated in FIGS. 9 and 10.

It will also be seen that the block or operating members 78 and 79 are provided respectively with lateral openings or holes 97 and 98 which openings perform the same essential functions as those openings identified by numerals 60 and 61 in the embodiment of FIGS. 1-8.

FIG. 11 illustrates the operating members as having assumed their final position in a totally tensioned condition of wires 84 and 85 which tensioning is accomplished as will be described hereinafter in connection with FIGS. 12-15. When the two wires 84 and 85 have been completely tensioned the final connection may be made as illustrated in FIG. 11. In this showing sleeve 87 has been crimped to the extreme end of wire 85 and short of the extreme end of wire 84 to lock the assembly together and in like fashion the extreme end of wire 84 is connected short of the end of wire 85 by a crimped sleeve 88 to assist in this assembly.

FIG. 11A shows a structural variation of the operating members 78 and 79. In this figure the members are identified as 78A and 79A and each member has its ends terminating in a slanted or angled surface 80. The surfaces 80 improve the alignment of the members and the wires that extend therethrough.

Figure 12:
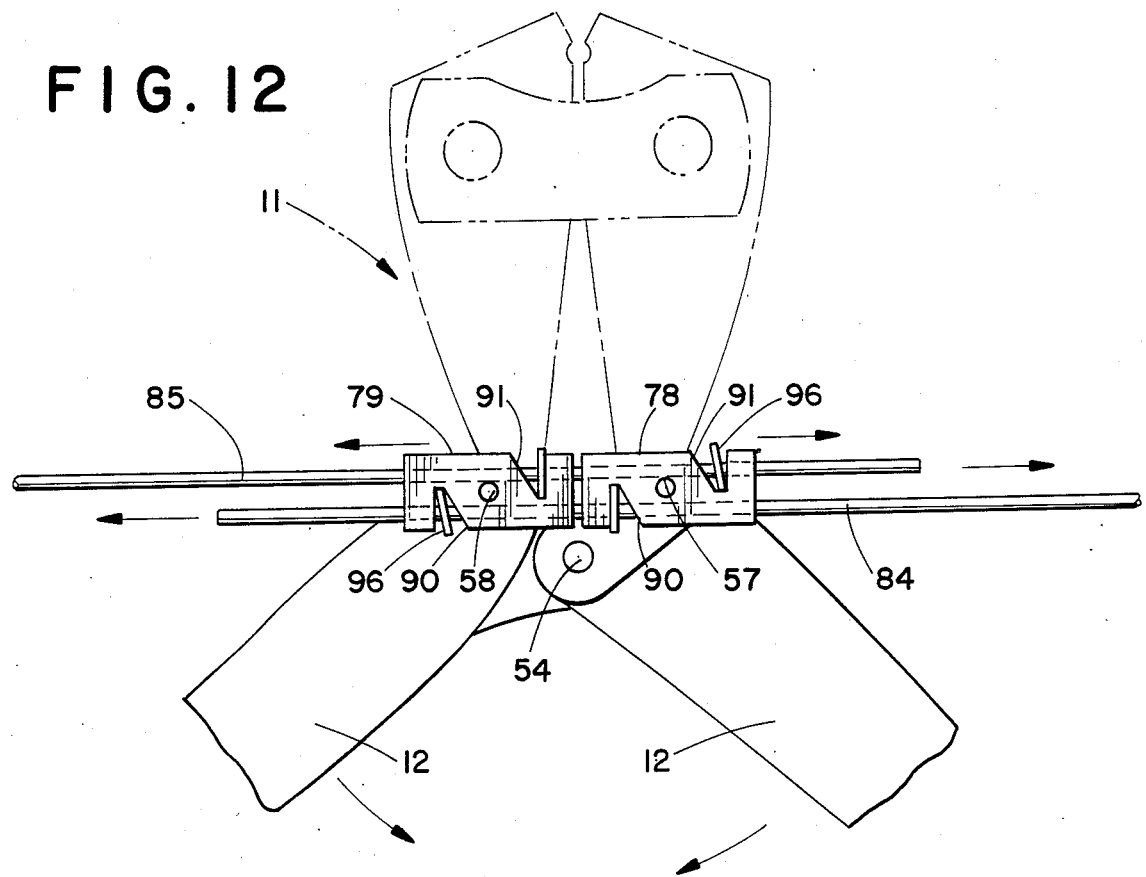

FIGS. 12-15 of this embodiment are similar in content to FIGS. 5-8 of the first embodiment discussed in this application. In this embodiment the same tool 11 is utilized in manipulating the operating members 78 and 79 in a manner which will now be discussed. Referring specifically to FIG. 12 it will be seen that the operating members 78 and 79 are assembled onto the wires 84 and 85 in the fashion shown and discussed in connection with FIG. 11. The studs 57 and 58 of the tool 11 are inserted respectively into the lateral openings 97 and 98 in operating members 78 and 79. The handles 12 of the tool are then moved in the direction of the arrows shown in FIG. 12 which results in the exertion of force on the operating members in the direction of the arrows. Under the circumstances and conditions illustrated in FIG. 12 the operating member 78 by way of the washer 96 in slot 91 grips wire 85 and the washer 96 in slot 90 does not grip wire 84. In operating member 79 the washer 96 in V-shaped slot 90 grips the wire 84 and the washer 96 in slot 91 does not grip wire 85. This means that as the operating or block members 78 and 79 are forced outwardly that a corresponding movement is imparted to the wires 84 and 85 in the same direction as the respective operating members move.

Figure 13:
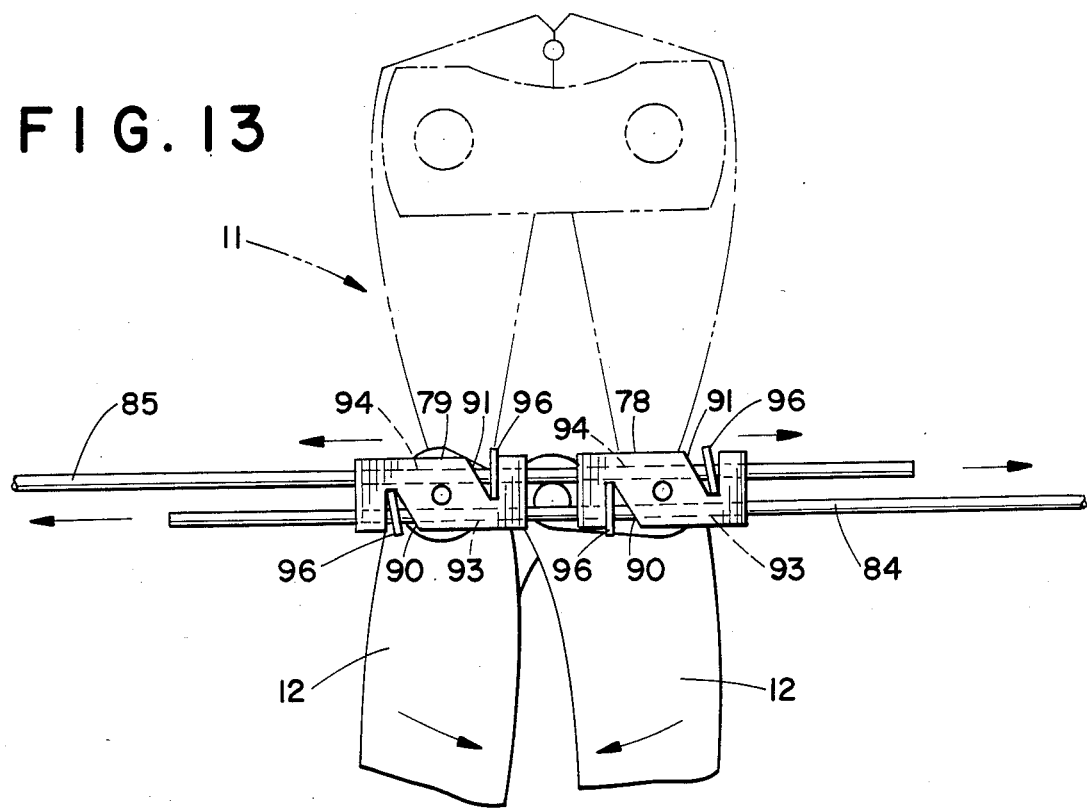

FIG. 13 illustrates the position of the tool 11 just prior to its extreme limit of movement in the directions illustrated by the arrows in FIGS. 12 and 13 and likewise illustrates the position of the operating members and their associated structure and the position to which the wires 84 and 85 have been moved. It will be noted in FIG. 13 that the position of the gripping washers in the operating members and their action on the respective wires 84 and 85 is the same as that illustrated in FIG. 12.

Figure 14:
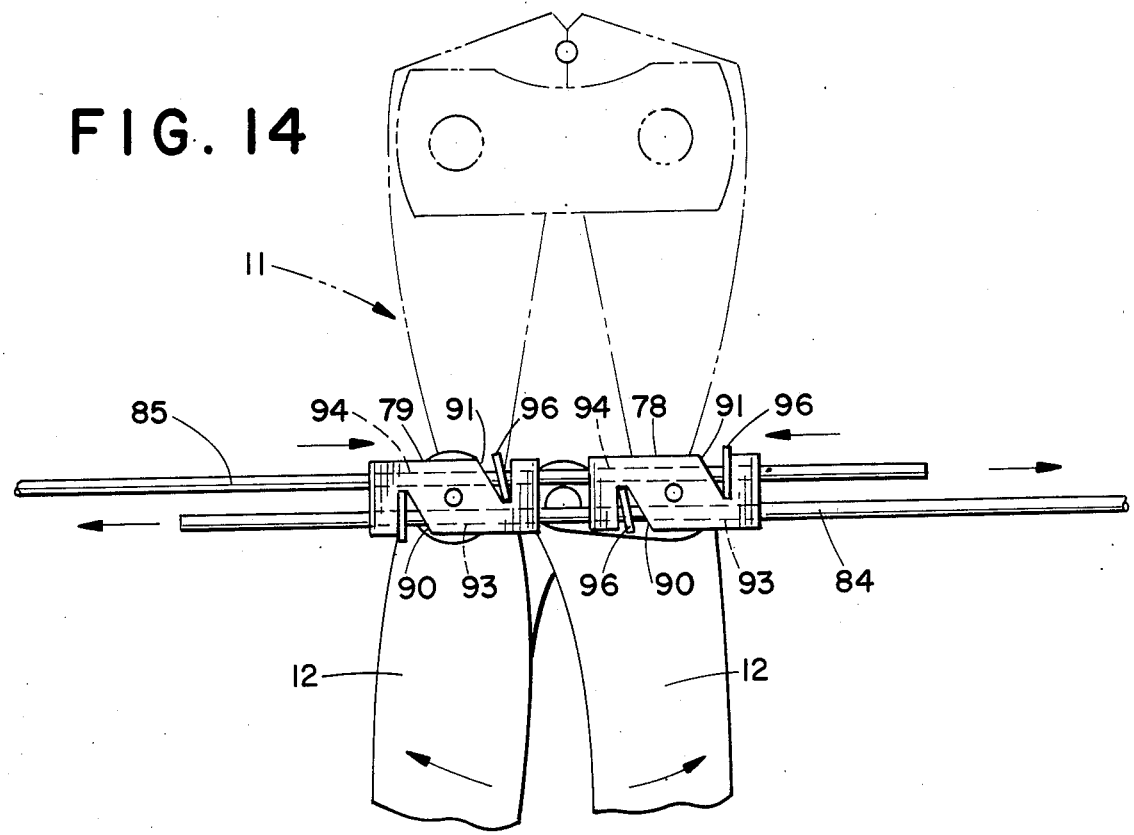

FIG. 14 is a view demonstrating the movement of the handles 12 of the tool 11 in a direction opposite to that shown in FIGS. 12 and 13 and illustrates the corresponding movement of the operating members 78 and 79 and the wires 84 and 85. It will be seen that the wires 84 and 85 continue to be moved in the same direction as shown in FIGS. 12 and 13 however by a different action of the operating members. The operating members 78 and 79 are now being moved toward each other and in this particular circumstance the gripping washer 96 in slot 90 of operating member 78 grips wire 84 causing it to move to the left and washer 96 in slot 91 of operating member 78 assumes its vertical position and does not prevent movement of wire 85 with respect to operating member 78. In operating member 79 gripping washer 96 in slot 91 causes wire 85 to move in the direction of travel indicated or to the right as seen in the figure and washer 96 in slot 90 of operating member 79 assumes its vertical position and does not prevent movement of wire 84 with respect to operating member 79.

Figure 15:
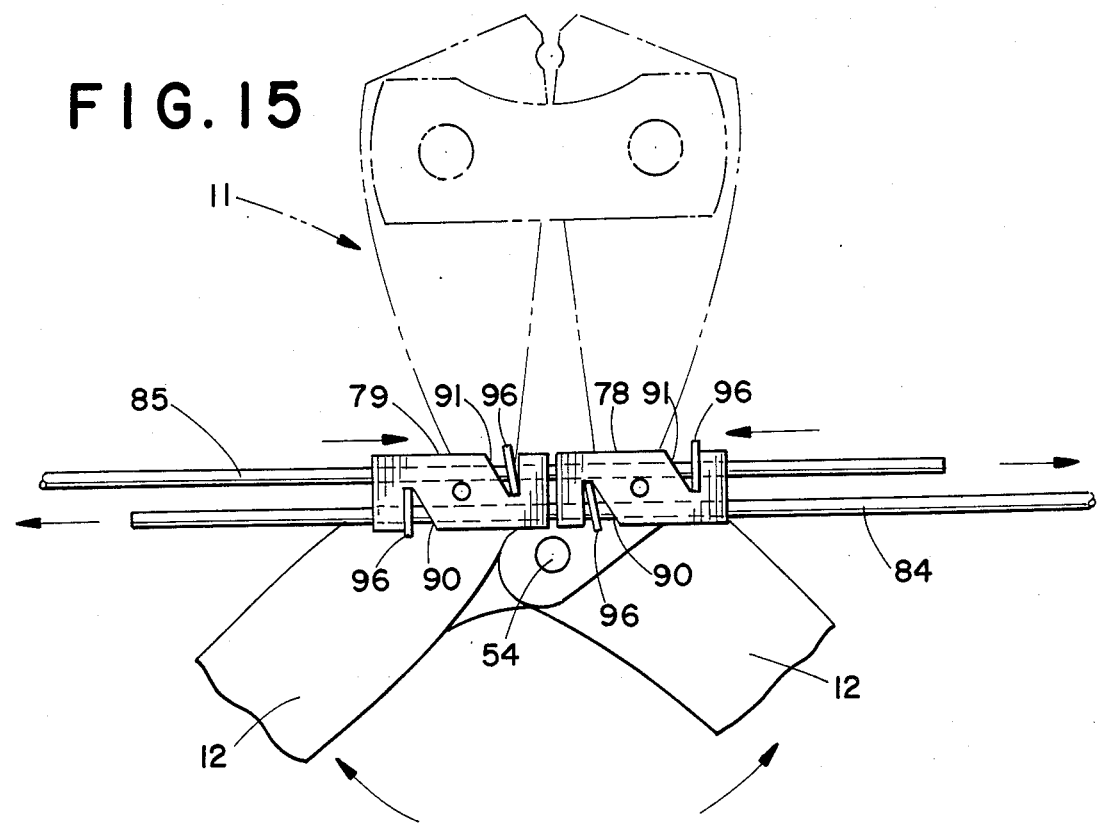

FIG. 15 illustrates the position of the tool and its handles 12 just prior to the limit of movement in the direction shown by the arrows in the figure and which directions were started as illustrated in FIG. 14 and described in conjunction therewith. It will be seen in FIG. 15 that the operating members have now been moved together or are just about to reach the limit of movement together with the result that the wires 84 and 85 have been moved to the position shown. The action of the gripping washers in the slots in FIG. 15 are the same as illustrated in FIG. 14.

The cycle of operation is repeated after the condition of FIG. 15 by repeating the cycle of FIGS. 12-15 sufficiently until the two wires have been tensioned to the desired amount for the given installation.

After the correct tension has been applied the sleeves of FIG. 11, namely sleeves 87 and 88 may be utilized to make the installation permanent and this can be occasioned either before or after removal of the tool 11.

FIG. 16 illustrates a use of only one of the operating members for example shown in FIG. 11. In this particular instance the operating member 78 has been illustrated and in all other respects the gripping washers and V-shaped slots are the same as illustrated in FIGS. 11-15. Illustrated here are wires 100 and 101 extending respectively through the openings 93 and 94 and it is thus illustrated how slack can be removed by a workman from the two wires 100 and 101. When a workman forces or pushes the wires in the direction illustrated by the arrows in FIG. 16 this movement is permitted because gripping washers 96 in both slots 90 and 91 move to their vertical position or in other words to that position shown by washers 96 in slot 91 of operating member 79 in FIG. 13 and washer 96 in slot 90 of operating member 78 in FIG. 13. When the workman releases the force on wires 100 and 101 in removing slack, the washers 96 in both slots 90 and 91 as illustrated in FIG. 16 tip or move from their vertical position thereby preventing removal of the wires in directions opposite the arrows shown in FIG. 16.

It will thus be seen that the objects of the present invention are carried out in an efficient and economical device for connecting and tensioning two wires. The device which is provided remains on the wire strand and presents a relatively unobtrusive appearance. The tensioning device of the present invention operates with a simple reciprocating longitudinal movement and is comprised of two operating members which have gripping means and the gripping means function alternately as one of the members moves relative to the other to alternately extend one wire in one direction of movement while holding another wire from movement in another direction. The invention as illustrated also demonstrates (FIGS. 11-15) how the invention can be designed as a double action device where movement and tensioning of two wires can be effected in both directions of the simple reciprocating movement of the block members. Additionally there has been demonstrated how a single block member having only one gripping device can be utilized to hold or dead end a wire and how a single one of the operating members having a gripping washer on the top and bottom might be used to take up tension in two wires Additional variations of the structure which bring about the desired results of the invention have been amply demonstrated so as to illustrate variations in the slots used in the operating members and the type of gripping washers that might be utilized to bring about the desired results It will be appreciated by those skilled in the art that other variations might be used within the spirit and scope of the present invention to bring about the same essential results.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A device for connecting first and second wire members including first and second block members having upper and lower side portions and first and second end portions, first and second longitudinally extending openings extending respectively through said lower and upper side portions from said first to said second end portions of each of said first and second block members, first and second wires adapted to extend respectively through said first and second openings in each of said first and second block members, first and second releasable gripping means located in said upper side portions of each of said first and second block members respectively and associated with said second opening and wire adapted to extend therethrough, said first block member movable relative to said second block member on the first wire and said releasable gripping means permitting movement of the second wire through said second opening in a given direction and preventing movement in an opposite direction.

2. A device as claimed in claim 1 wherein said first and second releasable gripping means each comprises a generally V-shaped slot carrying a washer member having an opening therein which opening is adapted to receive a wire therethrough.

3. A device as claimed in claim 2 wherein each of said V-shaped slots have one side extending generally perpendicular to a longitudinal axis of its associated longitudinally extending opening and have the other side extending at an acute angle to a longitudinal axis of its associated longitudinally extending opening.

4. A device as claimed in claim 3 wherein said perpendicularly extending sides of said respective V-shaped slots face in the same longitudinal direction.

5. A device as claimed in claim 4 wherein means are provided to secure the second wire to said first block member.

6. A device for connecting first and second wire members including a block member having upper and lower side portions and first and second end portions, first and second longitudinally extending openings extending respectively through said upper and lower side portions from said first to said second end portions of said block member, first and second wires adapted to extend respectively through said first and second openings in opposite directions, first and second releasable gripping means located in said upper and lower portions of said block member and respectively associated with said first and second openings and wires adapted to extend therethrough for permitting movement of first and second wires through said first and second openings in given opposite directions and preventing movement in reverse opposite directions, said first and second releasable gripping means each comprising a generally V-shaped slot carrying a washer member having an opening therein which opening is adapted to receive a given one of the first and second wires therethrough.

7. A device as claimed in claim 6 wherein each of said V-shaped slots has one side extending generally perpendicular to a longitudinal axis of its associated longitudinally extending opening and has the other side extending at an acute angle to a longitudinal axis of its associated longitudinally extending opening.

8. A device as claimed in claim 7 wherein said perpendicularly extending sides of said respective V-shaped slots face in mutually opposite longitudinal directions.

9. A device for connecting first and second wire members including first and second block members each having upper and lower side portions and first and second end portions, first and second longitudinally extending openings extending respectively through said upper and lower side portions from said first to said second end portions of each of said first and second block members, first and second wires adapted to extend respectively through said first and second openings in each of said first and second block members in opposite directions, first and second releasable gripping means located in said upper and lower portions of each of said first and second block members and respectively associated with said first and second openings and wires adapted to extend therethrough for permitting movement of first and second wires through said first and second openings in given opposite directions and preventing movement in reverse opposite directions, said first and second releasable gripping means in each of said first and second block members comprising a generally V-shaped slot carrying a washer member having an opening therein which opening is adapted to receive a given one of the first and second wires therethrough.

10. A device as claimed in claim 9 wherein each of said V-shaped slots has one side extending generally perpendicular to a longitudinal axis of its associated longitudinally extending opening and has the other side extending at an acute angle to a longitudinal axis of its associated longitudinally extending opening.

11. A device as claimed in claim 10 wherein said perpendicularly extending sides of said respective V-shaped slots in respective ones of said first and second block members face in opposite longitudinal directions.

12. A device for connecting the ends of first and second wires and tensioning the connected wires including in combination first and second operating member with said operating members movable back and forth longitudinally relatively to each other, means for connecting the first wire to said second operating member, first gripping means carried by said first operating member and selectively movable between first and second positions to either permit or prohibit relative movement between said first operating member and the second wire, second gripping means carried by said second operating member and selectively movable between first and second positions to either permit or prohibit relative movement between said second operating member and the second wire, said first gripping means prohibiting movement between the second wire and said first operating member in a first longitudinal direction of movement of said first operating member and said second gripping means prohibiting movement between the second wire and said second operating member when said first operating member moves in a second longitudinal direction.

13. A device as claimed in claim 12 wherein spring washers are included with the means for connecting the first wire to said second operating member which spring washers give a visual indication of tension in the connected wires.

14. A device for connecting the ends of first and second wires and tensioning the connected wires including in combination first and second operating members with said operating members movable back and forth longitudinally relative to each other, first and second generally parallel openings extending through each of said operating members with said openings in said members being aligned with each other, first and second wires adapted to extend through said first and second openings, first and second gripping means carried by said first operating member and selectively movable between first and second positions to either permit or prohibit relative movement between said first operating member and the first and second wires and second gripping means carried by said second operating member and selectively movable between first and second positions to either permit or prohibit relative movement between said second operating member and first and second wires, said first gripping means of said first operating member prohibiting movement between the second wire and said first operating member in a first longitudinal direction of movement of said first operating member, said second gripping means of said second operating member prohibiting movement between the first wire and second operating member when said operating member moves in a second longitudinal direction, said second gripping means of said first operating member prohibiting movement between the first wire and said first operating member in the second longitudinal direction of movement of said first operating member and said first gripping means of said second operating member prohibiting movement between the second wire and said second operating member when said second operating member moves in the first longitudinal direction.

* * * * *